No. 744,960. PATENTED NOV. 24, 1903.
F. L. EBELHARE.
SPEED INDICATOR.
APPLICATION FILED JUNE 25, 1903.
NO MODEL.
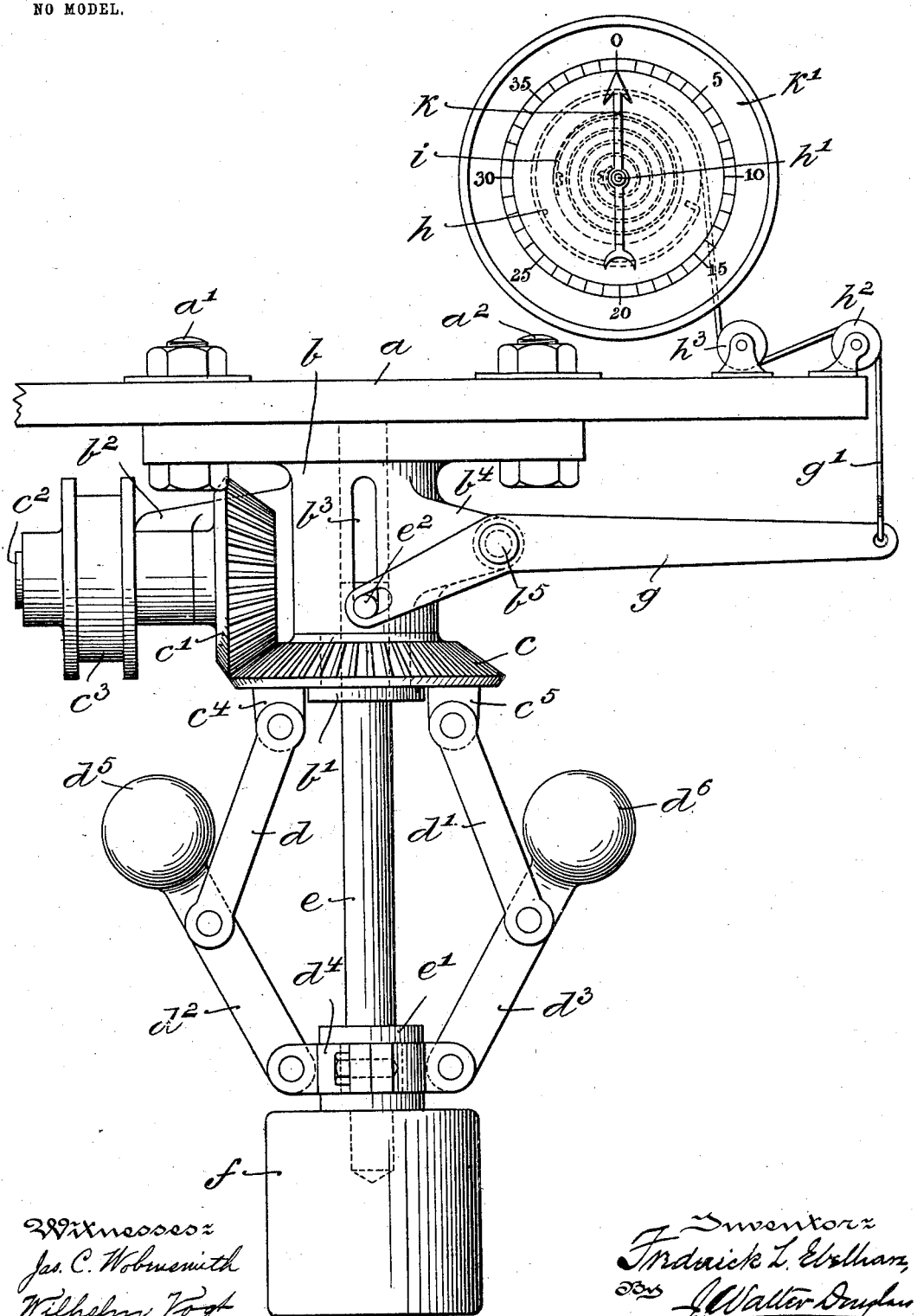
Witnesses:
Jas. C. Wobensmith
Wilhelm Vogt
Inventor:
Fredrick L. Ebelhare,
By J. Walter Douglas
Attorney No. 744,960. Patented November 24, 1903.

UNITED STATES PATENT OFFICE.

FREDERICK L. EBELHARE, OF PHILADELPHIA, PENNSYLVANIA.

SPEED-INDICATOR.

SPECIFICATION forming part of Letters Patent No. 744,960, dated November 24, 1903.

Application filed June 25, 1903. Serial No. 162,981. (No model.)

*To all whom it may concern:*

Be it known that I, FREDERICK L. EBELHARE, a citizen of the United States, residing at the city of Philadelphia, in the county of Philadelphia and State of Pennsylvania, have invented certain new and useful Improvements in Speed-Indicators, of which the following is a specification.

My invention has relation to a centrifugal speed-indicator for vehicles, engines, and other purposes, and in such connection it relates to the construction and particular arrangement thereof.

The principal object of my invention is to provide a comparatively simple and effective centrifugal speed-indicator for use on automobiles and other machines or appliances.

My invention, stated in general terms, consists of a centrifugal speed-indicator constructed and arranged in substantially the manner hereinafter described and claimed.

The nature and scope of my invention will be more fully understood from the following description, taken in connection with the accompanying drawing, forming part hereof, in which is illustrated in elevation an indicator embodying the particular features of my present invention.

Referring to the drawing, $a$ is a suitable support forming a part of a motor-vehicle or an engine, to which is secured by means of bolts $a'$ and $a^2$ a bracket $b$. The bracket $b$ is provided with an extension $b'$, adapted to support a bevel-gear $c$, which meshes with a bevel-gear $c'$, secured to a shaft $c^2$, mounted in a laterally-projecting arm $b^2$, preferably integral with the bracket $b$. To the shaft $c^2$ is secured a pulley $c^3$, which by means of a belt or the like (not shown) receives its rotary motion from any suitable source of power. (Not shown.) The bevel-gear $c$ is provided with lugs $c^4$ and $c^5$, to which are pivotally secured links $d$ and $d'$, adapted to engage arms $d^2$ and $d^3$, carried by a split sleeve $d^4$. The sleeve $d^4$ is movably secured to a collar $e'$, preferably integral with a spindle $e$, having a range of reciprocatory movement in a vertical direction in the bracket $b$. To permit of the movements of the spindle $e$ within the bracket $b$ and at the same time to prevent the rotation of the same, the spindle is provided at or near its upper end with a pin $e^2$, adapted to engage a slot $b^3$, arranged in the bracket $b$. Below the collar $e'$ the spindle $e$ is provided with a weight $f$, which tends to hold the weights $d^5$ and $d^6$, arranged at the free ends of the arms $d^2$ and $d^3$, in their normal position, which is fixed by the pin $e^2$ of the spindle $e$ and by the lugs $c^4$ and $c^5$ of the bevel-gear $c'$. As soon as the bevel-gear $c$ is rotated by means of the bevel-gear $c'$ and pulley $c^3$ the links $d$ and $d'$, weighted arms $d^2$ and $d^3$, and the sleeve $d^4$ will be readily rotated around the spindle $e$. The slightest rotation of the balls or weights $d^5$ and $d^6$, however, will move the same outward away from the spindle $e$ by the centrifugal force generated, and the spindle $e$ will instantly respond to the centrifugal action and will be lifted upward against the action of the weight $f$, tending to depress the spindle by gravity. The bracket $b$ is furthermore provided with an integral arm $b^4$, to which is pivotally secured in the point $b^5$ a lever $g$, adapted to engage the pin $e^2$ of the spindle $e$. To the free end of the lever $g$ is secured a cord or chain $g'$, passing over pulleys $h^2$ and $h^3$, secured to the support $a$, and which cord is fastened to a drum $h$, mounted on a shaft $h'$. This drum $h$ by the intervention of a spiral or fusee spring $i$, secured at one end to the drum $h$ and with the other end to the shaft $h'$, tends to wind the cord $g'$ upon itself and to hold the same taut. To the shaft $h'$ of the drum $h$ is secured a pointer $k$, which is adapted to travel over a dial-plate $k'$, having any suitable graduation. As soon as the spindle $e$ has been raised by the rotation of the weighted arms $d^2$ and $d^3$, links $d$ and $d'$, and bevel-gear $c$ through the action of centrifugal force and by means of the split sleeve $d^4$, the movement so imparted to the spindle is transmitted to the lever $g$ and by the same and the cord $g'$ to the drum $h$. From this drum the movement is transmitted to the shaft $h'$ by the spring $i$, and the pointer $k$ is rotated over the dial $k'$, recording by its movement the upward movement of the spindle $e$. The extent of this upward movement will of course be proportional to the speed of rotation imparted to the weighted arms $d^2$ and $d^3$ by means of the bevel-gears $c$ and $c'$. For this reason the speed of travel of a vehicle or the number of revolutions made by a certain part of an engine or the like will be instantly recorded from its starting-point or zero to the highest speed obtainable by said vehicle or engine in its travel.

Having thus described the nature and object of my invention, what I claim as new, and desire to secure by Letters Patent, is—

1. In a speed-indicator, a bracket, a spindle supported at one end by said bracket and slidably arranged therein, means engaging the other end of said spindle to hold the same in normal position in said bracket, rotary means supported by said bracket and loosely surrounding said spindle, a sleeve loosely engaging said spindle and fixed in its longitudinal position thereon, weighted arms supported by said sleeve and links connecting said weighted arms with said rotary means to transmit the rotary movement thereof to said weighted arms so as to rotate the same around said spindle.

2. In a speed-indicator, a bracket, a spindle supported at one end by said bracket and slidably arranged therein, means engaging the other end of said spindle to hold the same in normal position in said bracket, rotary means supported by said bracket and loosely surrounding said spindle, a sleeve loosely engaging said spindle and fixed in its longitudinal position thereon, weighted arms supported by said sleeve and links connecting said weighted arms with said rotary means to transmit the rotary movement thereof to said weighted arms so as to rotate the same around said spindle and to raise and lower said spindle in said bracket by said weighted arms.

3. In a speed-indicator, a bracket having a slot and an extension, said bracket supporting a bevel-gear, a spindle movably arranged in said bracket and having a pin engaging and sliding in the slot of said bracket and preventing the rotation of said spindle in the bracket, a collar arranged on said spindle and movably supporting a sleeve, links and weighted arms arranged between the bevel-gear and said collar and supported by the same and the pin of said spindle, a weight connected with said spindle for holding the weighted arms and links in their normal position with respect to said spindle, and means for rotating said bevel-gear on said bracket to impart to said weighted arms, links and sleeve a rotary movement on said spindle.

4. In a speed-indicator, a bracket having a slot and an extension, said bracket supporting bevel-gears, a spindle movably arranged in said bracket and having a pin engaging and sliding in the slot of said bracket to prevent the rotation of said spindle in the bracket, a collar arranged on said spindle and movably supporting a sleeve, links and weighted arms arranged between one of said bevel-gears and said collar and supported by said collar and the pin of said spindle, a weight connected with said spindle for holding the weighted arms and links in their normal position with respect to said spindle, and means for rotating said bevel-gears of said bracket to impart to said weighted arms, links and sleeve a rotary movement on said spindle to actuate said arms by centrifugal force and operate said spindle, in combination with a registering device, consisting of a lever supported by said bracket for engaging said pin and actuated by said spindle, a drum, a shaft supporting said drum, a spring connecting said drum with said shaft, a pointer arranged on said shaft, a dial arranged between said drum and pointer, a cord connecting said lever with said drum to transmit the movements of said spindle and lever to said drum, shaft and pointer so as to register said movements on said dial.

In testimony whereof I have hereunto set my signature in the presence of two subscribing witnesses.

FREDERICK L. EBELHARE.

Witnesses:
J. WALTER DOUGLASS,
THOMAS M. SMITH.